United States Patent
Chalasani et al.

(10) Patent No.: US 9,131,111 B2
(45) Date of Patent: Sep. 8, 2015

(54) METHODS AND APPARATUS FOR VIDEO COMMUNICATIONS

(71) Applicant: OpenExchange, Inc., Boston, MA (US)

(72) Inventors: Venkat Subrahmanyam Chalasani, Charlestown, MA (US); Doug Ashton, Winchester, MA (US)

(73) Assignee: OpenExchange, Inc., Boston, MA (US)

( * ) Notice: Subject to any disclaimer, the term of this patent is extended or adjusted under 35 U.S.C. 154(b) by 119 days.

(21) Appl. No.: 14/058,913

(22) Filed: Oct. 21, 2013

(65) Prior Publication Data

US 2014/0125759 A1  May 8, 2014

Related U.S. Application Data

(60) Provisional application No. 61/721,836, filed on Nov. 2, 2012.

(51) Int. Cl.
*H04N 7/15* (2006.01)

(52) U.S. Cl.
CPC .................................... *H04N 7/152* (2013.01)

(58) Field of Classification Search
USPC ....................................................... 348/14.09
See application file for complete search history.

(56) References Cited

U.S. PATENT DOCUMENTS

| | | | |
|---|---|---|---|
| 8,456,507 B1 * | 6/2013 | Mallappa et al. | 348/14.08 |
| 8,489,887 B1 * | 7/2013 | Newman et al. | 713/182 |
| 8,749,611 B2 * | 6/2014 | Lam et al. | 348/14.08 |
| 8,848,025 B2 * | 9/2014 | Talukder | 348/14.08 |
| 8,994,775 B2 * | 3/2015 | Lee et al. | 348/14.02 |
| 2007/0156924 A1 | 7/2007 | Ramalingam et al. | |
| 2011/0270933 A1 | 11/2011 | Jones et al. | |
| 2013/0155169 A1 * | 6/2013 | Hoover et al. | 348/14.02 |
| 2014/0104372 A1 * | 4/2014 | Calman et al. | 348/14.08 |

OTHER PUBLICATIONS

International Search Report and Written Opinion for International Patent Application No. PCT/US2013/067778 mailed Feb. 12, 2014, (7 pages).

* cited by examiner

*Primary Examiner* — Joseph J Nguyen
(74) *Attorney, Agent, or Firm* — Goodwin Procter LLP

(57) ABSTRACT

A videoconferencing architecture that connects various external parties and codecs by establishing outgoing connections from a virtual room to designated video endpoints.

18 Claims, 5 Drawing Sheets

METHODS AND APPARATUS FOR VIDEO COMMUNICATIONS

CROSS-REFERENCE TO RELATED APPLICATIONS

This application claims priority to and benefit of U.S. Provisional Patent Application No. 61/721,836, filed on Nov. 2, 2012, which is incorporated herein by reference in its entirety.

BACKGROUND OF THE INVENTION

Despite three decades of usage and development, videoconferencing is still, for the most part, a technology that has not lived up to its promise. Current videoconferencing technologies, for the most part, suffer from a complicated set-up process, especially when the videoconferencing users utilize heterogeneous technologies, e.g., different client devices or software, etc. The set-up process can become even more complicated when connecting with new video endpoints outside the enterprise LAN or WAN.

Some of the complexity in the set-up process for web based and video collaboration platforms derives from the use of "Meet Me" logic to connect users, whereby the videoconferencing system creates a central location, a room, or a virtual space for clients to connect with. The potential participants are typically given a URL link to that virtual room and the participants all "meet" at that location by connecting their clients to that central, virtual location. This simple method allows access to a meeting, but suffers from several problems.

First, the use of a URL to designate a central location for clients to connect with allows a user to forward that URL to unauthorized third parties for usage. The conference participants must either accept that the conferencing system is insecure or the system must implement additional measures to determine whether the clients (e.g., endpoint devices) connecting to the system are authorized (e.g., by using PIN codes). Second, even with additional security measures, e.g., the PIN code information can still be forwarded, requiring active management of the participant list by the organizer. Third, the use of a URL to designate a location to receive inbound client connections can enable participants on the call to identify the other participants on the call. Fourth, when a user loses connection to the central location and rejoins, that user may be reintroduced as a new participant, and not as an existing participant of the call.

Other methods of connection that involve direct calling between the two parties requires involvement of information technology professionals of each party's organization. Such IT professionals would have to apply changes to the security apparatus (firewalls, etc.) for each call. This complicates the use of technology and can also create security problems for an organization seeking to facilitate or participate in a video conference.

SUMMARY OF THE INVENTION

Embodiments of the present invention avoid these problems, in part, by avoiding a "meet me" approach (i.e., where clients connect to a central server or location) in favor of a "find you" approach (i.e., where a central server or virtual location initiates connections with individual clients, who may use different technologies, endpoints, etc.). The advantages of the present invention include, without limitation, a secure meeting setup that calls out to users, eliminating the ability of the users to join the meeting room without an invitation. Further advantages include the ability of multiple parties to communicate with each other without sharing the details of their endpoints, to avoid unscheduled calls to their endpoints, and the ability to use multiple video codec based endpoints to join the room without setup for every call. Further advantages include the ability to switch endpoints by a participant without losing her identity during the call. Furthermore, the different endpoints that can substitute for one another (e.g., mobile, personal, room-based) can use different video codecs.

Accordingly, in one aspect, a method for establishing a video conference includes associating, by a central infrastructure, a set of video endpoints with each one of several users. Each set of endpoints includes a preferred video endpoint, and the set associated with a first user includes a substitute video endpoint in addition to the preferred video endpoint in that set. The method also includes starting the video conference by creating a communication link between a processor configured to offer a virtual room and the preferred video endpoint of each of the sets associated with the several users. Thus, the central infrastructure initiates a link between the virtual room and the first endpoint corresponding to each user, i.e., each video conference participant. The method further includes switching, during the video conference, a first communication link between the virtual room and the preferred video endpoint of the set associated with the first user to a second communication link between the virtual room and the substitute video endpoint of that set. Thus, for some duration during the conference, the first user participates using the preferred video endpoint, and for another duration, the first user participates using the substitute endpoint.

In some embodiments, an identity and credentials of each user are maintained separately from an identity and credentials of each endpoint in the set of endpoints associated with that user. Moreover, the method may include recognizing the identity of the first user after the switching from the preferred endpoint to the substitute endpoint occurred. The identity of the first user may be recognized, even though, the identity of the preferred video endpoint associated with the first user may be different than the identity of the substitute video endpoint associated with the first user. The method may include receiving from each of the several users a registration for the video conference. The registration may include an identification of the set of video endpoints accessible to each of the users.

The method may further include transmitting a first video data from the virtual room via the first communication link using a first transcoding, and transmitting the first video data from the virtual room via the second communication link using a second transcoding that is different than the first transcoding. The different transcoding may be selected because one or more parameters of the substitute endpoint (e.g., number of screens, aspect ratio, required display resolution, etc.) may be different than one or more corresponding parameters of the preferred endpoint.

In some embodiments, a third communication link to the preferred video endpoint in the set associated with a second user is created, and the method includes transmitting a first video data from the virtual room via the first communication link using a first transcoding. The method may also include transmitting a second video data from the virtual room via the third communication link, using a third transcoding that is different than the first transcoding. Thus, video data exchanged with a first user employs one type of transcoding while video data exchanged with a second user employs a different transcoding. These video data may be related, e.g., frames received from the first user may be transmitted to the second user and to other conference participants, and those received from the second user may be transmitted to the first user, and to other participants in the conference.

In various embodiments, the processor configured to offer the virtual room that includes or is a secure, temporary virtual room. The processor may also be configured to automatically destroy the virtual room substantially at termination of the video conference. In this way, the likelihood that some unauthorized person may gain access to any confidential data shared between the participants during the video conference is minimized. The method may also include maintaining a history of conference calls and usage of video endpoints.

The method may also include detecting a loss of the first communication link between the virtual room and the preferred video endpoint of the set associated with the first user. In response to the detection of the loss, the first communication link may be reestablished. These steps may be performed by the central infrastructure, so that a user does not need to take any action to rejoin the conference, and the central infrastructure may recognize that not a new participant but a previous participant has rejoined.

In another aspect, a system for establishing a video conference includes a call management infrastructure that includes a database and a virtual room infrastructure. The database associates with each one of a number of users a set of video endpoints. Each set includes a preferred video endpoint, and the set associated with a first user includes a substitute video endpoint in addition to the preferred video endpoint. The virtual room infrastructure includes a processor configured to offer a virtual room for a video conference, and a communication interface configured to establish a communication link between the virtual room and the preferred video endpoint of each of the sets associated with the several users. The communication interface is further adapted to switch, during the video conference, a first communication link between the virtual room and the preferred video endpoint of the set associated with the first user to a second communication link between the virtual room and the substitute video endpoint of that set. Thus, for some duration during the conference, the first user participates using the preferred video endpoint, and for another duration, the first user participates using the substitute endpoint.

The system may maintain an identity and credentials of each user separately from an identity and credentials of each endpoint in the set of endpoints associated with that user. The virtual room infrastructure may be adapted to recognize the identity of the first user after the switch, even though, the identity of the preferred video endpoint associated with the first user is different than the identity of the substitute video endpoint associated with the first user. Thus, even though the first user participates in the conference using two difference devices (e.g., a desktop computer, and a tablet) at different times, the system can automatically recognizes that the participant is the same, without any particular action or input from the first user.

In some embodiments, the call management infrastructure further includes a database manager adapted to receive via a communication link a command from a user. In response to the command, the database manager may modify the set of video endpoints associated with that user. The modification may include addition of a new video endpoint (e.g., a new device, a new software application for rendering video, etc.) to the set, removal of a previously included endpoint from the set, or both. Alternatively or in addition, the modification may include designation of a video endpoint different than the preferred video endpoint as the preferred video endpoint.

The call management infrastructure may further include a video decision engine adapted to analyze for each one of the various users, a parameter of the preferred video endpoint from the set of endpoints associated with that user. The call management infrastructure may then select, based on at least in part, the analysis of the parameters, a video infrastructure for the virtual room. The video infrastructure may be selected so as to minimize transcoding of video data to be exchanged via the communication links. The call management infrastructure may additionally include a video control engine adapted to configure the processor based on, at least in part, a selected video infrastructure. Thus, the processor may offer the virtual room according to the selected video infrastructure.

In some embodiments, the communication interface includes a signaling controller configured to send an invitation signal to the preferred video endpoint of the set of endpoints associated with each user. The communication interface may include a media router in electrical communication with the preferred video endpoint of each of the sets of video endpoints associated with the various users, thereby establishing the communication links for exchange of video data between the conference participants. The media router may transcodes a video signal from the virtual room to the preferred video endpoint of the first user, and alternatively or in addition, may transcode a video signal received from the preferred video endpoint of the first user and to be delivered to the virtual room.

In some embodiments, the virtual room infrastructure is adapted to provide the virtual room that includes or is a secure, temporary virtual room. The virtual room infrastructure may destroy the virtual room substantially at termination of the video conference. The virtual room infrastructure may be adapted to detect a loss of the first communication link between the virtual room and the preferred video endpoint of the set associated with the first user. In response to the detection of the loss, the virtual room infrastructure may automatically reestablish the first communication link, without requiring any action by the first user.

DETAILED DESCRIPTION OF THE INVENTION

Figure 1:
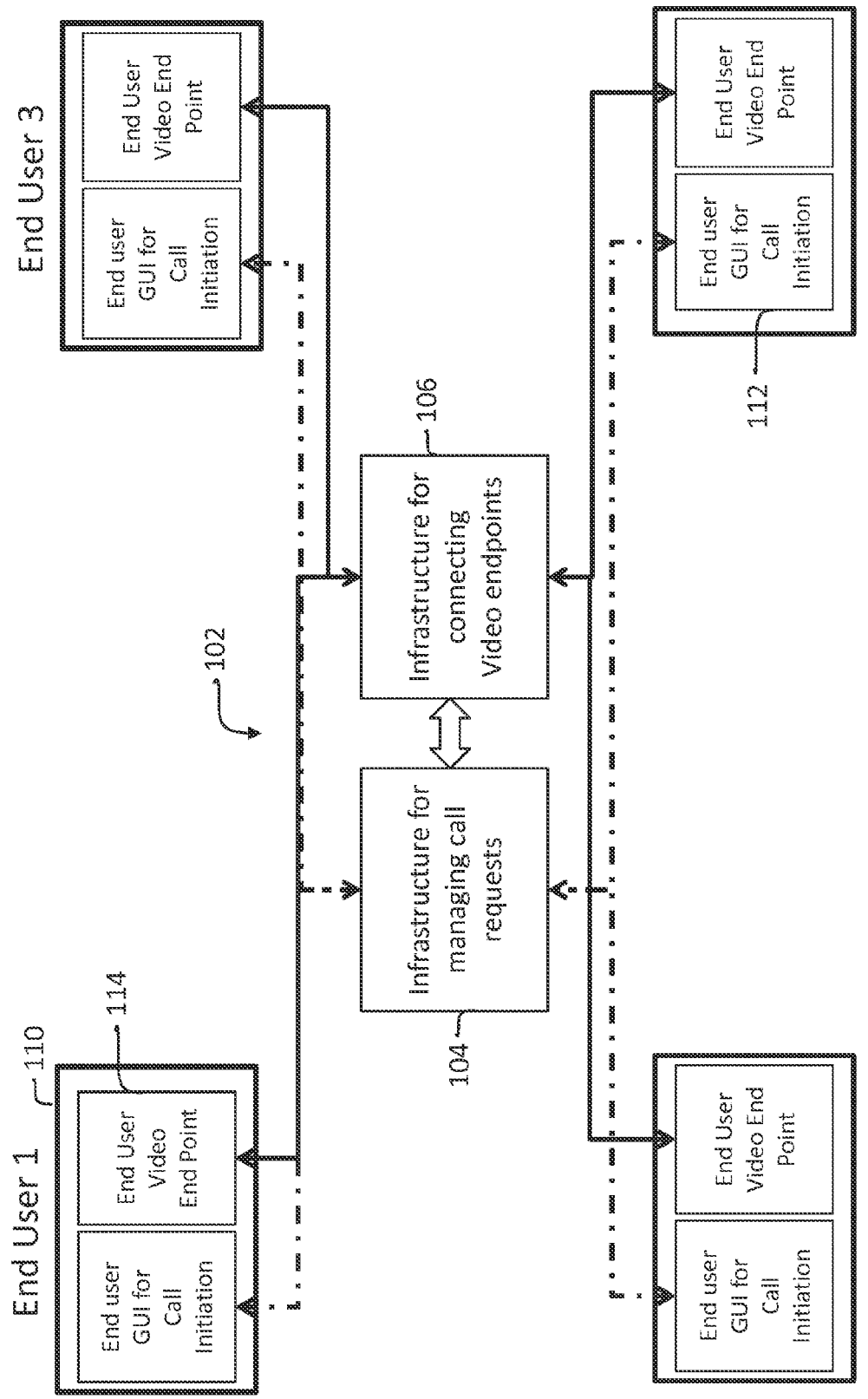
FIG. 1 schematically depicts a video conferencing system according to one embodiment.

With reference to FIG. 1, an embodiment of a video conferencing system 102 includes an infrastructure 104 for managing call requests, and an infrastructure 106 for establishing a virtual meeting room and for connecting various video endpoints with each other via the virtual room. As used herein, the term video includes audio/visual communications that may include one or more of speech and non-speech sounds, text, documents, images, and image frames representing motion. In general, the infrastructures 104, 106 may include software modules or a combination of software modules and circuitry. The software modules may be implemented by a single computer or server, or by different servers. A user module 110 includes a graphical user interface (GUI) 112 and a video endpoint 114. More than one user module may be associated with one user, and some user modules may be shared by more than one user while others may be used exclusively by a single user. The user module 110 typically includes a processor to execute a software module to provide the GUI 112. In some embodiments, the GUI 112 includes a remote control.

The video endpoint 114 includes a display, and in some embodiments, the endpoint 114 includes software components, such as a player, that is executed by a processor in the user module 110. Exemplary user modules include desktop computers, laptops, tablet computers, smart phones, video conferencing equipment including a television monitor and a camera, etc. As such, each user has an identity on the system 102 that is independent of the video endpoints the user may use for different video conferences, or at different times during a single video conference.

Each user can create a video endpoint configuration during registration with the system. To this end, a user may supply a list of video endpoints to the infrastructure 104 for managing calls, and after appropriate transversal and firewall considerations candidate endpoints may be selected from the list and added to the user's individual profile. The user may select one or more of these candidate endpoints in the profile for use in an ad hoc or a scheduled video conference.

Figure 2:
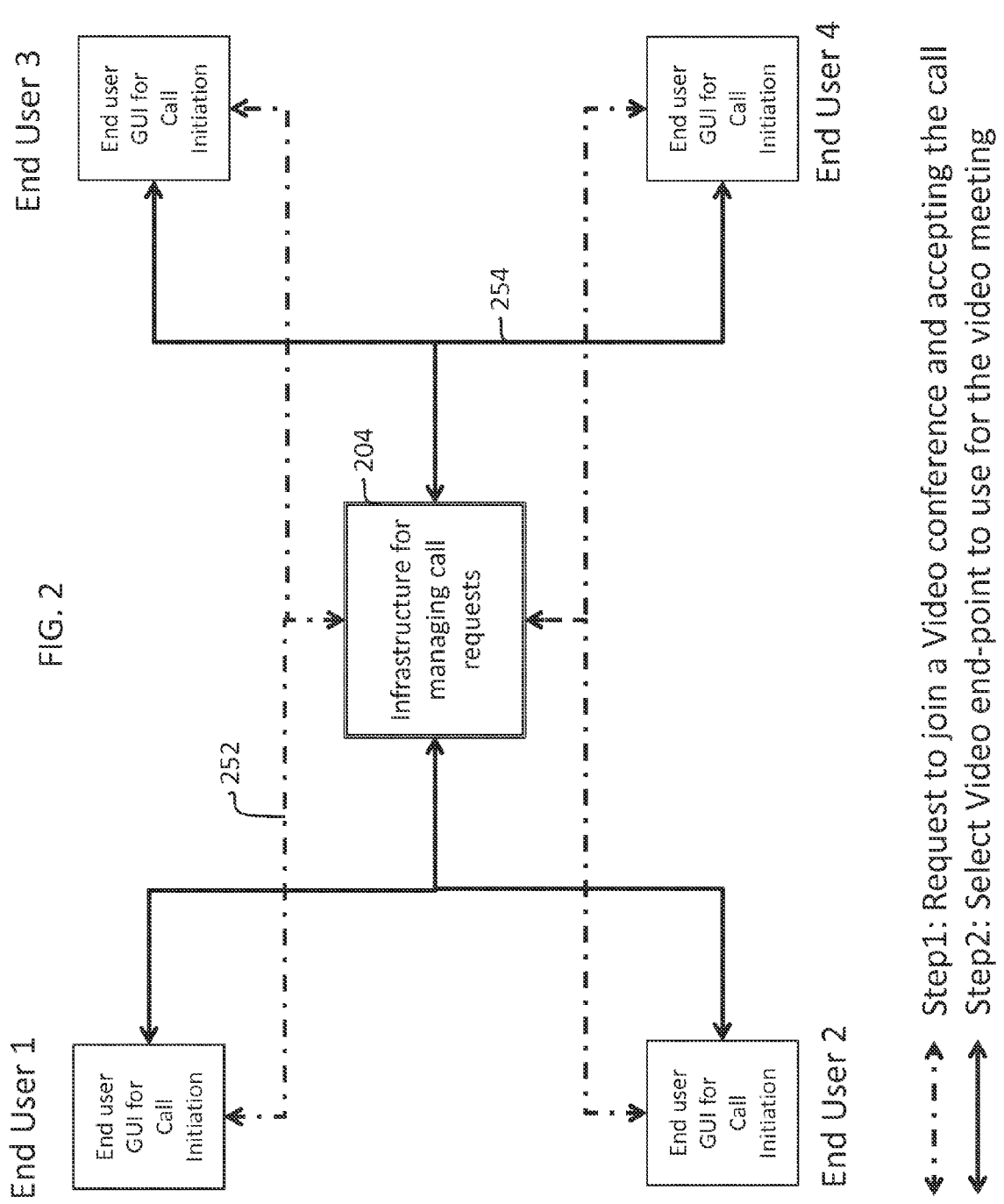
FIG. 2 depicts an exemplary process for initiating a multiparty conference according to one embodiment.

With reference to FIG. 2, a user who wishes to communicate with other users signs in with the central infrastructure 204 for managing calls to join a scheduled call or to initiate an ad hoc call (Step 252). Each user may then confirm to the central infrastructure 204 which video endpoints, from the candidate endpoints established during registration, the user would like to use for that particular video conference (Step 254). The central infrastructure 204 creates a secure one-time use virtual video meeting room.

Figure 3:
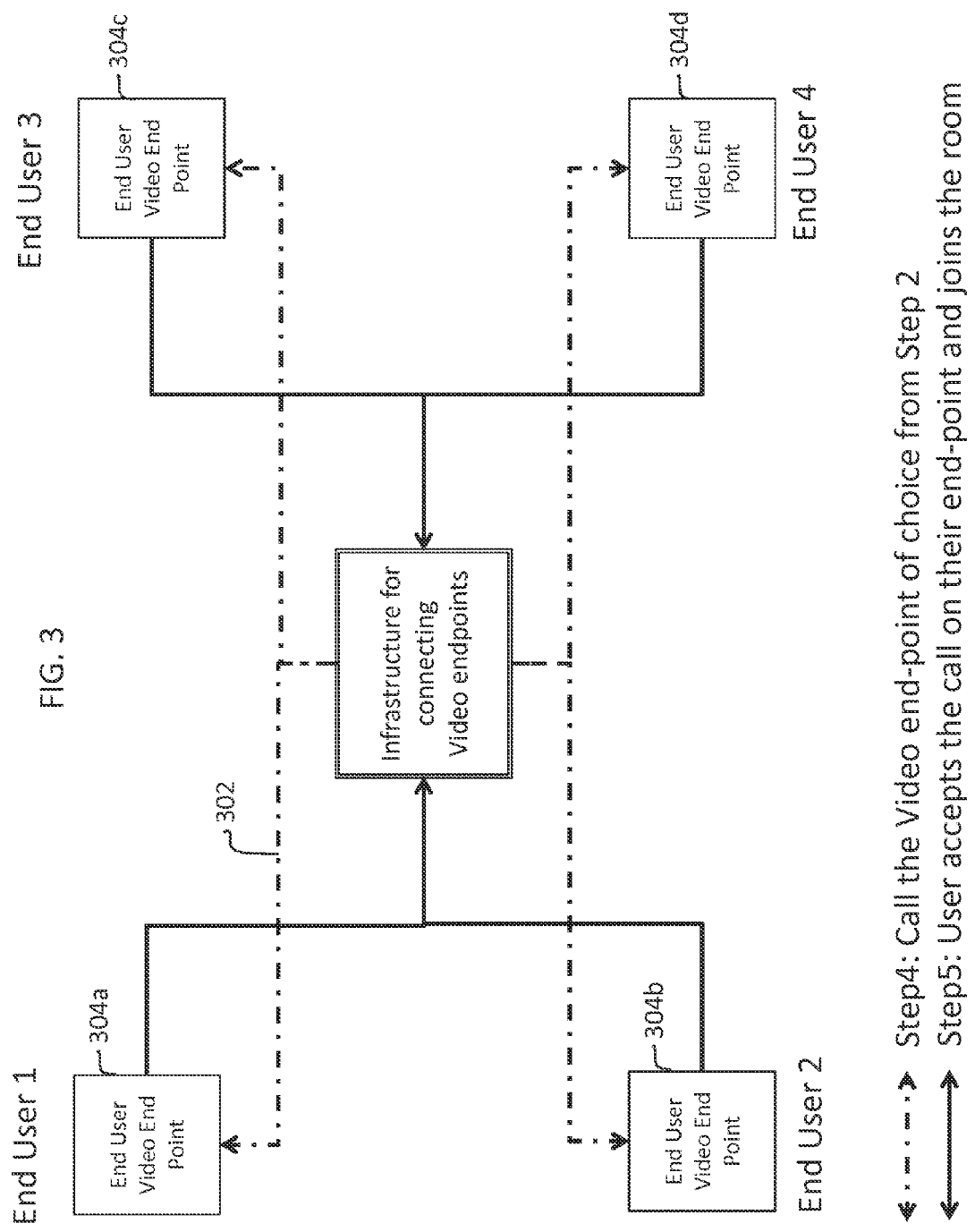
FIG. 3 shows an exemplary process of creating connections with video endpoints according to one embodiment.

With reference to FIG. 3, once created, the virtual meeting room can establish outgoing connections 302 to the video endpoints 304a through 304d that the participating users specified for use in the video conference. When contacted by the virtual meeting room, each video endpoint typically prompts the user to accept the connection request. When two or more users accept the connection request, the infrastructure for connecting to the various endpoints creates communication links between the virtual room and each video endpoint for which the connection request was accepted, and the video conference may begin. Different video clients that may be associated with different endpoints can be supported during the video conference using, e.g., transcoding or video bridging.

During the call each participant can leave the meeting and join from the same video endpoint or a different video endpoint while maintaining the user's identity on the platform. Specifically, the other participants may automatically receive audio, visual, or both notifications informing them that a certain user has left the conference, or rejoined the conference. This is facilitated because the system/platform is aware of not only the endpoint devices disconnecting from or connecting to the system but also the users associated with those devices. As such, the system can recognize a participant regardless of a user's temporary departure from the conference. In some embodiments, no notification is provided to the other users when one user switches from one endpoint device to another during the conference. Here again, the system recognizes that the participating user is the same as before, and only the endpoint device used for communication is different.

After the video conference is completed, the virtual meeting room is destroyed. The infrastructure for connecting to the various endpoints terminates the communication links to those endpoints. The destruction of the room may be controlled by rules set by the organizer of the meeting. The organizer for this purpose can be anyone who sets up a meeting on the platform or calls other people directly.

Figure 4:
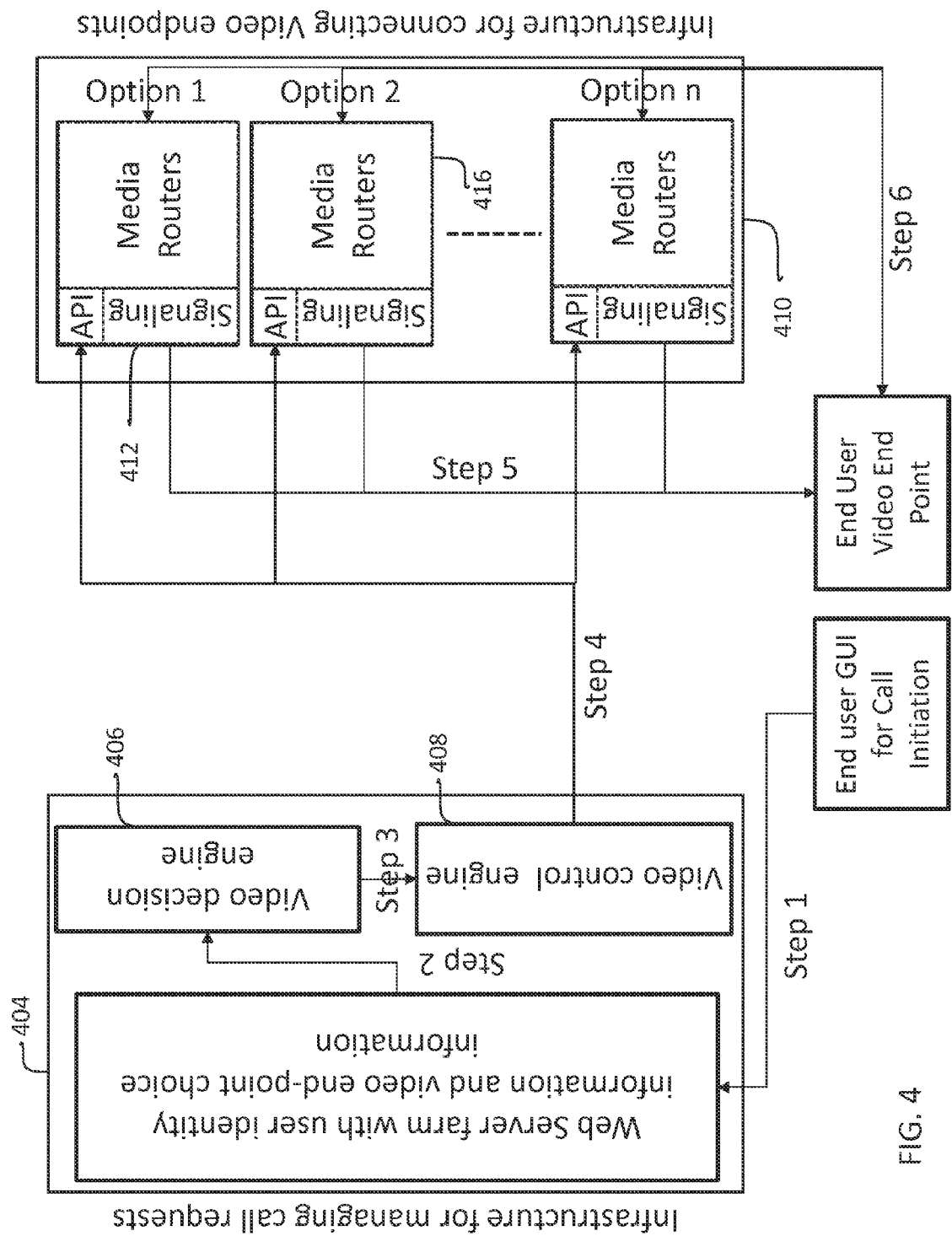
FIG. 4 illustrates details of a video call, according to one embodiment.

Further details of the video conference including the virtual meeting room are shown in FIG. 4. All users share their choices of video endpoints, including a preferred endpoint and additional endpoints, with the infrastructure 404 for managing call information of a central system 402. This can be done when a user registers with the system 402. A user may provide or update such choice generally anytime, e.g., when a user decides to participate in a particular video conference call, or initiates a video conference, e.g., by directly calling another user on the platform, or by scheduling a meeting. Different endpoints may use different codecs such as H263, H264 AVC, H264 SVC, H265, Web RTC, etc. Other presently known and future developed codecs that may be used with video endpoints are also within the scope of the present invention. Thus, at Step 1, the infrastructure 404 for managing calls has knowledge of the identities of registered users, and their respective video endpoint choices.

A webserver (associated with the infrastructure 404) supplies the video endpoint choices of the participants to a video decision engine 406, which then chooses a suitable video infrastructure to be used for the call (Step 2). The selection criteria include compatibility with the video endpoints to be used in the conference. Exemplary parameters considered in the selection of a suitable infrastructure include a number of screens associated with an endpoint, technology used by the host of the call, any special requirements of the participating users, etc. Typically, video infrastructures are various hosted solutions that may be controllable through application program interfaces (APIs). Once the video infrastructure is selected, that information is passed to the video control engine 408 (Step 3). The video control engine 408 accesses the selected video infrastructure through the infrastructure's API and creates a temporary video room, i.e., a virtual room, for the call (Step 4).

Thereafter, the video control engine 408 initiates calls to the video endpoints of users' preferred choices through a signaling controller 412 in the infrastructure 410 for connecting the endpoints (Step 5). Once the signaling handshake is completed, media transfer rules are set and the actual media transfer can occur between a selected video endpoint 414 that is associated with a user and media routers 416 of the infrastructure 410 for connecting endpoints (Step 6). The media routers 416 can use the native codec of the infrastructure for communications (e.g., H263, H264 AVC, H264 SVC, H265, Web RTC) while connecting the video endpoints that do not use the infrastructure codec through gateways or protocol translators. As each endpoint is registered in the system, technology of the endpoint, desired video quality, and "URI," etc., can be collected. Based on this information, an appropriate codec translator infrastructure or a gateway is selected. The gateways may be obtained from third-part vendors, and various gateways can provide interconnectivity between standard codecs. Using pre-established rules, the video control engine identifies and constructs an appropriate path, i.e., via a suitable gateway or a direct path, to each endpoint.

Figure 5:
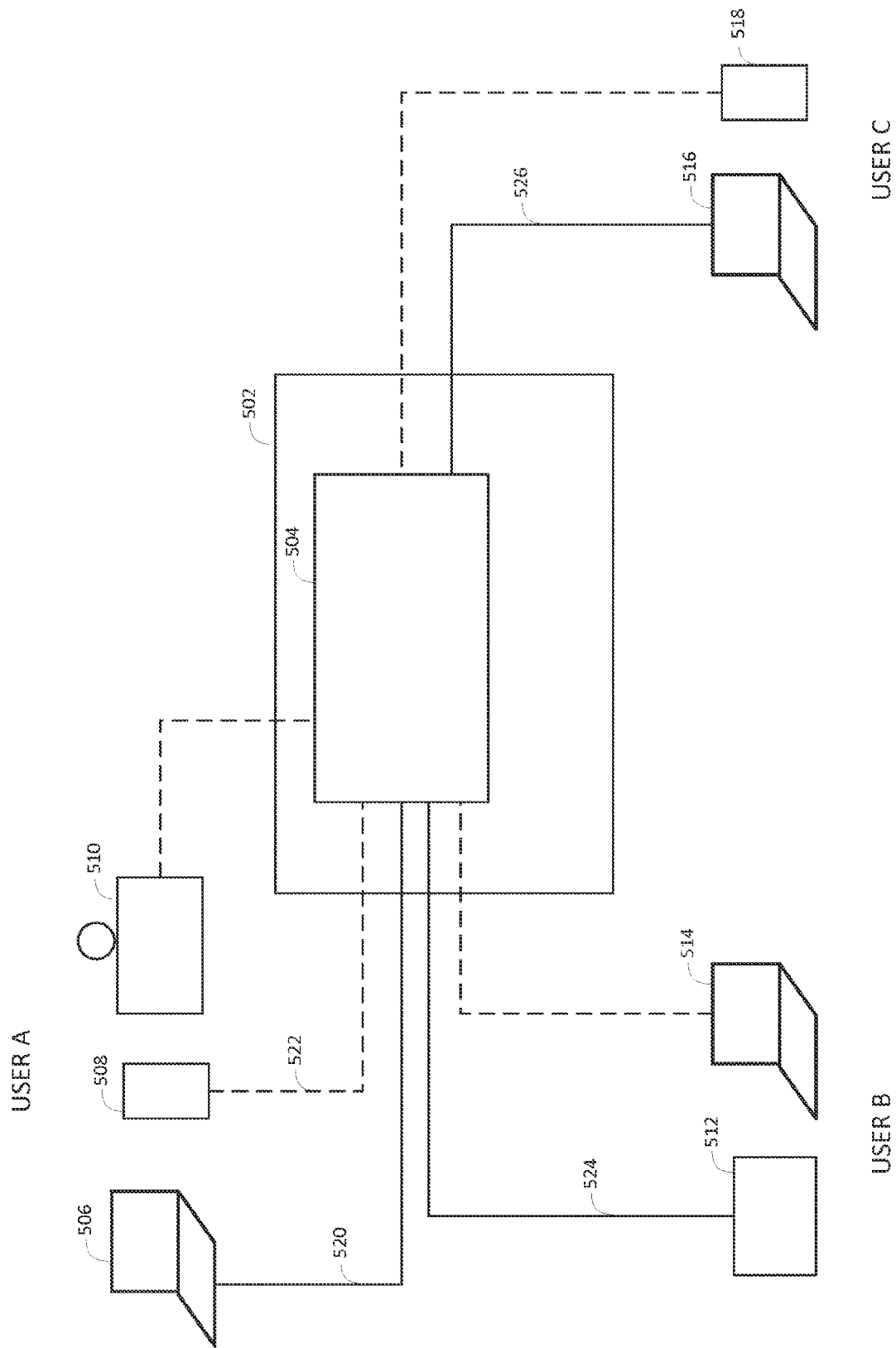
FIG. 5 illustrates switching endpoints during a conference, according to one embodiment.

With reference to FIG. 5, in one embodiment, users "A," "B," and "C" exchange video data therebetween using a temporary, one-time use virtual room 502 created by a system 504. User A has a choice of three endpoints—user A's laptop computer 506, user A's smart phone 508, and an audio/visual (AV) system 510 in a conference room. The AV system 510 in the conference room may not be used exclusively by user A, and may be used by other people. User B has a choice of two endpoints—a tablet 512 and an office laptop 514. User C also has a choice of two endpoints—a computer 516 and a smart phone 518.

User C, as a host of a video conference, invites users A and B to participate in the conference at a certain time (e.g., Tuesday morning at 10 AM). Before that time, all three users A, B, and C register with the system 504. User A registers all three available endpoints 506, 508, and 510, and indicates that the laptop 506 is the preferred endpoint. User B also registers the endpoints 512 and 514, and indicates that the tablet computer 512 is the preferred endpoint. User C registers endpoints 516 and 518 and indicates that the computer 516 is the preferred endpoint. It is not necessary that each user register every time before a scheduled conference. Once registered, the system 504 can use a user's registration and endpoint preference for subsequent conferences. Users may also update their respective registrations, e.g., by adding one or more new endpoints, removing previously added endpoints, changing a preferred endpoint, etc.

In one embodiment, as the host starts the conference, the system 504 creates the temporary virtual room 502. The creation of the virtual room can be based on the characteristics of the preferred endpoints of the users registered to participate in the conference. Typically, one of these users is the host. For example, in one embodiment, the virtual room 502 can be configured to be most compatible with the computers 506 and 516, requiring minimized transformation of the video data to be exchanged by the users A, B, and C.

Typically at the scheduled conference time, the system 504 initiates a call to the preferred endpoint of each user registered for the conference. Thus, in this example, the system 504 calls user A at endpoint 506, user B at endpoint 512, and user C at endpoint 516. If at least two users accept the calls, the conference may begin. A link 520 from the virtual room 502 to the endpoint 506 may use the same transcoding as that used by the link 526 from the virtual room 502 to the endpoint 516. The virtual room 502 may provide transcoding for video communication on a link 524 that differs from the transcoding between the virtual room 502 and the endpoint 512, i.e., user B's tablet computer.

As the conference is in progress, user A may wish to leave her present location (e.g., her home) where the computer 506 is located, but may wish to continue participating in the conference. Therefore, user A may request from the system 504 a reconnection via her smart phone. In response, the system 504 may terminate or suspend link 520 and establish a new link 522 to the endpoint 508. Upon creation of the new link 522, the virtual room 502 may transmit video data to and receive video data from the smart phone 508 via the link 522 and not via the link 520. The transcoding for communication via the link 522 may be different than that used previously for video-data exchange via the link 520.

Alternatively, or in addition, the video data received from user A's smart phone 508 may have a format (e.g., encoding, aspect ratio, etc.) that is not suitable for sharing with the other endpoints in the conference, namely, user B's tablet 512 and user C's computer 516. As such, the virtual room 502, in response to a change in the endpoint used by user A, may further transcode data received from the smart phone 508 before forwarding it on the links 524 and 526 to user B's and user C's endpoints. In general, the system 504 allows any user participating in the conference to choose a different endpoint than the one that is currently used by that user. For example, user B may decide to use the office computer 514 instead of using the tablet 512, and user A, after reaching the conference room, may decide to use the conference room AV system 510 instead of using her smart phone 508 to participate in the video conference. Upon receiving a request for change of the endpoint, the system 504 may take the necessary actions, e.g., establishing new communication links, modifying the transcoding used for one or more communication links, etc., as described above.

During the video conference, a connection to a user (e.g., user B) may be lost, e.g., due to a dropped call, poor signal quality, etc. In that case, the system 504 detects the loss of communication via the link (e.g., 524) between the virtual room 502 and the endpoint the user was using at the time of the loss (e.g., tablet 512). The system 504 then attempts to reestablish the communication link to that endpoint (e.g., tablet 512), without requiring user B to take any action, such as calling in, notifying the system of the loss, etc. If communication cannot be reestablished via that endpoint, the user may request reconnection via another endpoint associated with that user, as described above.

One skilled in the art will recognize the various forms in which the systems and methods described herein may be implemented. For example, with reference FIG. 1, the user module 110 including the GUI 112 for conference initiation and the video endpoint 114, the central system 102 including the infrastructure 104 for managing call requests and the infrastructure 106 for connecting video endpoints, with reference to FIG. 4, the infrastructure 404 for managing call requests and the infrastructure 406 for connecting video endpoints, the web server, the video decision engine 406, the video control engine 408, signaling APIs 412, media routers 416, with reference to FIG. 5, the virtual room 502 and the central system 504, and various other components described herein may be implemented in any suitable hardware or software. If implemented as software, components of the invention may execute on one or more server class computers that have sufficient memory, data storage, and processing power and that run a server class operating system (e.g., Oracle® Solaris®, GNU/Linux®, and the Microsoft® Windows® family of operating systems). The server class computer may be grouped in a cluster having one or more working nodes. The different components such as the infrastructures 104, 106 may execute on a separate server (virtual or physical) in the cluster, or it may execute on a server that also operates as a working node.

The invention also be practiced in distributed computing environments where tasks are performed by remote processing devices that are linked through a communications network. In a distributed computing environment, program modules may be located in both local and remote computer storage media including memory storage devices. Other types of system hardware and software than that described herein may also be used, depending on the capacity of the device and the amount of required data processing capability. The invention may also be implemented on one or more virtual machines executing virtualized operating systems such as those mentioned above, and that operate on one or more computers having hardware such as that described herein.

A communications network may connect the computing devices with each other, for example, by providing various links such as the links 520-526 depicted in FIG. 5. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used.

Local and/or remote software may be implemented on hardware such as a smart or dumb terminal, network computer, workstation, minicomputer, mainframe computer, server, personal digital assistant, wireless device, smartphone, tablet, television, gaming device, music player, mobile telephone, laptop, palmtop, wireless telephone, information appliance, or other computing device, that is operated as a general purpose computer or a special purpose hardware device that can execute the functionality described herein. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories may store data in various forms and/or instructions that, when executed by a processor, form the modules, engines, and other components described herein and perform the functionality associated with the therewith. The processor and the memory can be supplemented by, or incorporated in special purpose logic circuitry.

In some cases, relational (or other structured) databases may provide such functionality, for example, as a database management system which stores any form of data for processing. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

Although internal components of the computer are not shown, those of ordinary skill in the art will appreciate that such components and the interconnections are well known. Accordingly, additional details concerning the internal construction of the computers need not be disclosed in connection with the present invention.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Various aspects and features of the various embodiments of the invention may be used in various combinations and permutations and all such variants are considered to be within the scope of the invention.

Accordingly, we claim:

1. A method for establishing a video conference, the method comprising performing by a central infrastructure the steps of:
    associating with each one of a plurality of users a set of video endpoints, each set comprising a preferred video endpoint, and the set associated with a first user comprising a substitute video endpoint in addition to the preferred video endpoint;
    starting the video conference by creating a communication link between a processor configured to offer a virtual room and the preferred video endpoint of each of the sets associated with the plurality of users;
    switching, during the video conference, a first communication link between the virtual room and the preferred video endpoint of the set associated with the first user to a second communication link between the virtual room and the substitute video endpoint of that set,
    wherein an identity and credentials of each user are maintained separately from an identity and credentials of each endpoint in the set of endpoints associated with that user; and
    recognizing the identity of the first user after switching, even though, the identity of the preferred video endpoint associated with the first user is different than the identity of the substitute video endpoint associated with the first user.

2. The method of claim 1, further comprising receiving from each of the plurality of users a registration for the video conference, the registration comprising identification of the set of video endpoints accessible to each of the users.

3. The method of claim 2, further comprising:
    transmitting a first video data from the virtual room via the first communication link using a first transcoding; and transmitting the first video data from the virtual room via the second communication link using a second transcoding different than the first transcoding.

4. The method of claim 1, wherein a third communication link to the preferred video endpoint in the set associated with a second user is created, the method further comprising:
transmitting a first video data from the virtual room via the first communication link using a first transcoding; and
transmitting a second video data from the virtual room via the third communication link, using a third transcoding different than the first transcoding.

5. The method of claim 1, wherein the processor configured to:
offer the virtual room comprising a secure, temporary virtual room; and
automatically destroy the virtual room substantially at termination of the video conference.

6. The method of claim 1, further comprising maintaining a history of conference calls and usage of video endpoints.

7. The method of claim 1, further comprising performing by the central infrastructure the steps of:
detecting a loss of the first communication link between the virtual room and the preferred video endpoint of the set associated with the first user; and
reestablishing the first communication link, in response to the detection of the loss.

8. A system for establishing a video conference, the system comprising: a call management infrastructure comprising a database associating with each one of a plurality of users a set of video endpoints, each set comprising a preferred video endpoint, and the set associated with a first user comprising a substitute video endpoint in addition to the preferred video endpoint; and a virtual room infrastructure comprising: a processor configured to offer a virtual room for a video conference; and a communication interface configured to: (i) establish a communication link between the virtual room and the preferred video endpoint of each of the sets associated with the plurality of users, (ii) switch, during the video conference, a first communication link between the virtual room and the preferred video endpoint of the set associated with the first user to a second communication link between the virtual room and the substitute video endpoint of that set; wherein: an identity and credentials of each user are maintained separately from an identity and credentials of each endpoint in the set of endpoints associated with that user; and the virtual room infrastructure is adapted to recognize the identity of the first user after the switch, even though, the identity of the preferred video endpoint associated with the first user is different than the identity of the substitute video endpoint associated with the first user.

9. The system of claim 8, wherein the call management infrastructure further comprises a database manager adapted to: (i) receive via a communication link a command from a user, and (ii) in response to the command, modify the set of video endpoints associated with that user.

10. The system of claim 9, wherein the modification comprises at least one of: (i) an addition of a new endpoint to the set, (ii) a removal of an endpoint from the set; and (iii) designation of a video endpoint different than the preferred video endpoint as the preferred video endpoint.

11. The system of claim 8, wherein the call management infrastructure further comprises a video decision engine adapted to: (i) analyze for each one of the plurality of users, a parameter of the preferred video endpoint from the set of endpoints associated with that user, and (ii) select, based on at least in part, the analysis of the parameters a video infrastructure for the virtual room.

12. The system of claim 11, wherein the selection of the video infrastructure minimizes transcoding of video data to be exchanged via the communication links.

13. The system of claim 8, wherein the call management infrastructure further comprises a video control engine adapted to configure the processor based on, at least in part, a selected video infrastructure.

14. The system of claim 8, wherein the communication interface comprises a signaling controller configured to send an invitation signal to the preferred video endpoint of the set of endpoints associated with each user.

15. The system of claim 8, wherein the communication interface comprises a media router in electrical communication with the preferred video endpoint of each of the sets associated with the plurality of users, thereby establishing the communication links.

16. The system of claim 15, wherein the media router transcodes at least one of: (i) a video signal from the virtual room to the preferred video endpoint of the first user, and (ii) a video signal received from the preferred video endpoint of the first user and to be delivered to the virtual room.

17. The system of claim 8, wherein the virtual room infrastructure is adapted to:
provide the virtual room comprising a secure, temporary virtual room; and
destroy the virtual room substantially at termination of the video conference.

18. The system of claim 8, wherein the virtual room infrastructure is adapted to:
detect a loss of the first communication link between the virtual room and the preferred video endpoint of the set associated with the first user; and
reestablish the first communication link, in response to the detection of the loss.

* * * * *